United States Patent
Jay et al.

[11] Patent Number: 5,758,618
[45] Date of Patent: Jun. 2, 1998

[54] INJECTION VALVE ARRANGEMENT

[75] Inventors: David Charles Jay, Vähäkyrö, Finland; Rolf Prillwitz, Möglingen, Germany

[73] Assignee: Wartsila Diesel International Ltd OY, Helsinki, Finland

[21] Appl. No.: 790,472

[22] Filed: Jan. 29, 1997

[30] Foreign Application Priority Data

Jan. 30, 1996 [FI] Finland .................................. 960414

[51] Int. Cl.⁶ .................................................. F02B 3/00
[52] U.S. Cl. .................................... 123/299; 123/25 C
[58] Field of Search ............................. 123/299, 25 C, 123/304, 25 E, 25 Q

[56] References Cited

U.S. PATENT DOCUMENTS

| | | | |
|---|---|---|---|
| 3,610,529 | 10/1971 | Huber | 239/96 |
| 5,170,751 | 12/1992 | Tosa et al. | 123/25 C |
| 5,529,024 | 6/1996 | Wirbeleit et al. | 123/25 C |
| 5,647,316 | 7/1997 | Hellen et al. | 123/299 |

FOREIGN PATENT DOCUMENTS

| | | | |
|---|---|---|---|
| 37 24 987 | 2/1988 | Germany | F02M 43/00 |
| 43 41 739 | 3/1995 | Germany | F02M 47/02 |
| 43 37 048 | 5/1995 | Germany | F02M 43/00 |
| 2 051 234 | 1/1981 | United Kingdom | F02M 43/00 |

*Primary Examiner*—Willis R. Wolfe
*Assistant Examiner*—Hieu T. Vo
*Attorney, Agent, or Firm*—Smith-Hill and Bedell

[57] ABSTRACT

An injection valve arrangement for injecting an auxiliary medium into a combustion chamber of a cylinder of an internal combustion engine in order to reduce the concentration of noxious substances in the exhaust gases of the engine comprises a valve body bounding a first chamber into which the pressure medium is continuously fed through a feed duct and an elongated valve member for controlling the feeding of the auxiliary medium from the first chamber into the combustion chamber of the cylinder and being spring-loaded toward a closed position, in which it prevents the injection of the additional medium. The valve body also bounds a second chamber into which the auxiliary medium is fed, and the pressure prevailing in the second chamber urges the valve member toward the closed position. A control valve controls the pressure in the second chamber so that when the control valve opens, the pressure in the second chamber falls and the valve member moves to an open position allowing injection of the auxiliary medium.

12 Claims, 1 Drawing Sheet

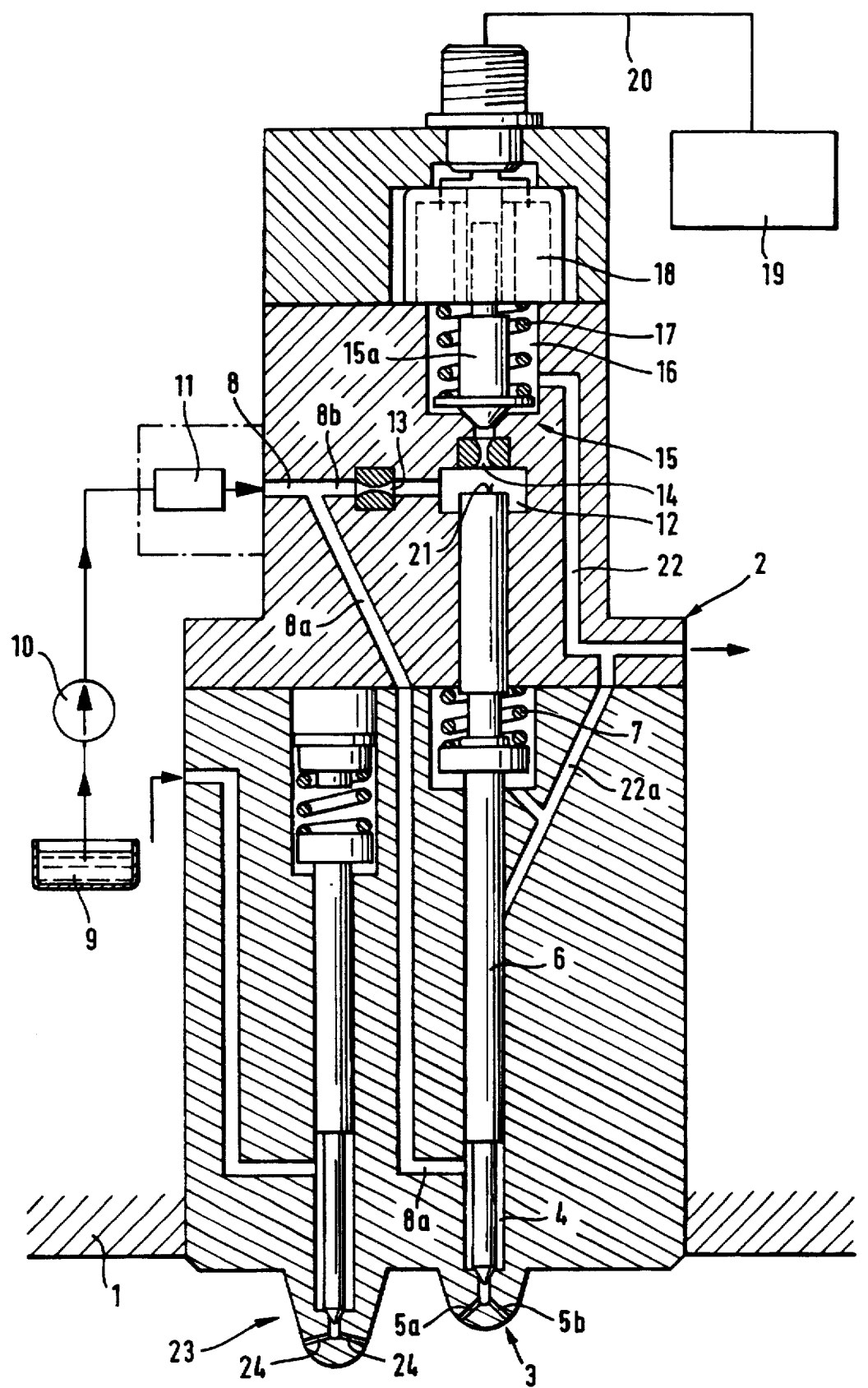

INJECTION VALVE ARRANGEMENT

BACKGROUND OF THE INVENTION

This invention relates to an injection valve arrangement.

It is known to inject an auxiliary medium, i.e. a medium other than fuel, into the combustion chamber of an engine for the purpose of affecting the burning process in the combustion chamber. For example, it is known to inject water, liquid ammonia, urea or the like as an auxiliary medium in order to reduce the concentration of nitrogen oxides, NOx, in the exhaust gases of the engine relative to operation without injection of the auxiliary medium. Different electronically controlled injection valve arrangements are known for injecting such an auxiliary medium. A drawback in these known solutions is the complicated construction and the use of space, which is especially due to the fact that oil is used as a pressure medium for controlling the injection. A practical consequence of this is that it is necessary to prevent mixing of the oil and the auxiliary medium to be injected, and this requires suitable sealing arrangements.

An aim of the invention is to provide a new solution applicable to the injection of an auxiliary medium, from which the drawbacks relating to the known technique have been eliminated. A further aim is to provide a solution applicable especially to the injection of water and having an uncomplicated and compact construction and being reliable as to its operation.

SUMMARY OF THE INVENTION

In accordance with the invention the arrangement includes a second chamber, into which the auxiliary medium is fed. The pressure prevailing in the second chamber presses the valve member for controlling injection of the auxiliary medium toward its closed position, in which it prevents injection of the auxiliary medium from an injection chamber by way of nozzle orifices. A control valve is associated with the second chamber and arranged to control the pressure in the second chamber so that the movement of the control valve to an open position causes the pressure in the second chamber to fall. As a consequence, the valve member of the injection valve moves toward its open position and allows injection of the auxiliary medium. Thus, the auxiliary medium to be injected into the cylinder and the pressure medium utilized for controlling the injection of the auxiliary medium are the same, and so no special sealing of the valve member to the valve body portion between the injection chamber and the second chamber is required.

Preferably, the second chamber is connected to the feed duct that supplies the auxiliary medium to the injection chamber. In this case, only one feeding means is needed for feeding the auxiliary medium to both the injection chamber and the second chamber.

In a favorable embodiment of the invention, the second chamber is connected to the feed duct through a first throttle aperture so that the drop in pressure that occurs in the second chamber when the control valve opens is at least partially isolated from the injection chamber and does not adversely affect the pressure of the auxiliary medium in the injection chamber through the feed duct. Moreover, the second chamber is connected to the control valve through a second throttle aperture. The isolation provided by the first and second throttle apertures ensures that the high pressure in the injection chamber does not place excessive demands on the control valve. Advantageously, the area of the second throttle aperture is substantially larger than the area of the first throttle aperture. Preferably, the area of the second throttle aperture is at least about five times the area of the first throttle aperture.

The feed duct for the auxiliary medium may be provided with a pressure control means prior to the feeding of the auxiliary medium into the first chamber and the second chamber.

Water is with advantage used as the auxiliary medium.

The control valve is with advantage located in a third chamber, which is provided with a drain passage for the additional medium. In addition the control valve is spring-loaded towards its closed position. In practice the control valve is with advantage a solenoid valve, which receives an electric control signal from an electronic control unit dependent on the operation of the engine. Hereby as precise control as possible can be obtained for the injection of the auxiliary medium.

The valve body may also with advantage include a fuel injection valve, the nozzle orifices of which are arranged at a different position in the axial direction of the engine cylinder than the nozzle orifices of the auxiliary medium valve.

The invention can with advantage be applied especially in large diesel engines. In this specification the term "large diesel engine" is intended to refer to such an engine that can be used, for example, as the main propulsion engine or an auxiliary engine for a ship or in a power plant for producing electricity and/or heat energy.

BRIEF DESCRIPTION OF THE DRAWINGS

In the following the invention is described, by way of example, with reference to the accompanying drawing, the single figure of which shows an embodiment of an injection valve arrangement according to the invention in section.

DETAILED DESCRIPTION

In the drawing 1 indicates a cylinder head of an engine. A valve body 2 is mounted in the cylinder head. The valve body 2 includes an injection valve 3 comprising a chamber 4 containing an auxiliary medium to be injected into the combustion chamber of a cylinder (not shown) through one or more nozzle orifices 5a, 5b, etc. under the control of an elongated valve member 6. A spring 7 urges the valve member 6 toward its closed position, in which it prevents injection. The valve 3 may with advantages be a so-called needle valve. In the following the auxiliary medium is presumed to be water.

The water to be injected into the cylinder is fed from a container 9 into a feed duct 8 and further through a feed duct branch 8a into the chamber 4 by means of a pump 10 which operates continuously and continuously maintains a pressure in the feed duct 8. Arranged between the pump 10 and the feed duct 8 there is a so-called flow fuse 11 that detects changes in the flow pressure and acts on the flow as needed. For instance, the flow fuse 11 may cut off the feeding of water in the event that the valve member 6 is jammed so that it does not close completely; or the flow fuse 11 can be arranged to provide a pressure pulse at the beginning of an injection cycle, when the pressure tends to decrease, so that the pressure does not decrease for instance more than 30 bar from the desired injection pressure.

Water is also fed through a feed duct branch 8b and a throttle aperture 13 located therein into a second chamber 12, in which it acts on the valve member 6 through a surface 21. Since normally the force urging the valve member toward its closed position, due to the pressure of the water in the chamber 12 and the spring force of the spring 7, exceeds the force on the valve member due to the pressure of the water in the chamber 4, the valve member 6 remains in its closed position and no water is injected into the cylinder.

The chamber 12 is connected through a throttle aperture 14 and a valve port controlled by a control valve 15 to a chamber 16 in the valve body 2. A drain passage 22 connects the chamber 16 to the container 9. The control valve 15 includes a valve member 15a and is provided with a solenoid means 18 for controlling the operation thereof. The solenoid means 18 receives control signals 20 from an electronic control unit 19, which may be preprogrammed to provide the control signals timely in accordance with the working cycle of the engine, for instance on the basis of signals from a sensor sensing the rotation of the crankshaft of the engine. When there is no current in the solenoid means 18, a spring 17 urges the valve member 15a into a closed position, in which it closes the valve port and water cannot flow through the throttle aperture 14 from the chamber 12 to the chamber 16.

When a control signal 20 from the control unit 19 supplies current to the solenoid means 18, the valve member 15a moves against the force of the spring 17 to an open position, in which the connection from the chamber 12 to the drain passage 22 through the throttle aperture 14, the valve port and the chamber 16 is opened. As a consequence thereof the pressure in the chamber 12 decreases to such an extent that the force due to the pressure in the chamber 4 is able to overcome the force tending to close the valve and the valve member 6 of the injection valve 3 moves to its open position against the force of the spring 7, whereby injection of water into the combustion chamber of the cylinder takes place through the nozzle orifices 5a, 5b.

The throttle aperture 13 and the flow fuse 11 ensure that the decrease of the pressure in the chamber 12 does not affect the pressure of the water in the chamber 4, and that the injection occurs under sufficient pressure. Since the passage connecting the chambers 12 and 16 is restricted by the throttle aperture 14, the spring 17 need only exert a small force to close the valve port and the construction is accordingly compact. On the other hand, in order that the pressure in the chamber 12 decreases quickly enough and to a sufficient extent when the control valve 15 is opened, the throttle aperture 14 must be suitably larger than the throttle aperture 13. In practice the proportion between the areas of the throttle apertures 14 and 13 may typically be for instance 5:1.

The control valve 15 is close to the chamber 12 and so the passage connecting the chambers 12 and 16 is short and the total volume of this passage and the chamber 12 is relatively small. This allows the control valve to exert effective and precise control over the elongated valve member 6.

Since the auxiliary medium to be injected is the same as the pressure medium for the control valve, no special sealing of the valve member 6 is needed between the chambers 4 and 12. Excess pressure medium can be collected through a branch 22a of the drain passage 22. On the other hand, the nature of the pressure medium, which is advantageously water, must be taken account of when selecting the materials for the solenoid means 18 and when designing the environment of operation thereof.

A compact construction is achieved when a fuel injection valve 23 with nozzle orifices 24 is also integrated into the valve body 2. Then the injection of the fuel and of the auxiliary medium can be mutually arranged with ease so that an optimum result can be obtained from the viewpoint of the burning and of the noxious substances resulting therefrom.

The invention can also be implemented so that different feeding means, for instance separate pumps and feed ducts, are used for feeding the auxiliary medium into the first chamber 4 and the second chamber 12 respectively. In this case the first throttle passage 13 is not necessarily needed at all, but in other respects the arrangement will be more complicated.

The invention is not restricted to the embodiment shown but several modifications are feasible within the scope of the attached claims.

We claim:

1. An injection valve arrangement for injecting an auxiliary medium into a combustion chamber of an internal combustion engine in conjunction with injection of a fuel into the combustion chamber, the auxiliary medium being selected so that concentration of noxious substances in combustion products of the fuel is reduced relative to when no auxiliary medium is injected into the combustion chamber, the arrangement comprising:

an injection valve for injecting said auxiliary medium into the combustion chamber, the injection valve comprising a valve body portion which bounds first and second chambers, a feed duct means for supplying said auxiliary medium to the first and second chambers, and a passage that extends from the second chamber and opens into a pressure relief space, wherein said first chamber is in communication with the combustion chamber by way of at least one nozzle orifice, and the injection valve further comprising an elongated valve member which extends through the first chamber and is movable in the valve body portion between a closed position, in which it prevents injection of the auxiliary medium from the first chamber into the combustion chamber, and an open position, in which it allows auxiliary medium from the first chamber to be injected into the combustion chamber by way of the nozzle orifice, and a spring urging the valve member toward its closed position, and wherein the first chamber is bounded by a first piston surface of the valve member and the second chamber is bounded by a second piston surface of the valve member, said first and second piston surfaces facing respectively toward and away from the combustion chamber, and a control valve associated with said passage and having a closed position in which it blocks said passage and an open position in which it allows auxiliary medium to escape from the second chamber to the pressure relief space by way of the passage, such that when the control valve is in the open position the pressure of the auxiliary medium in the second chamber falls and the force acting on the valve member due to the pressure of the auxiliary medium in the first chamber is sufficient to move the elongated valve member to its open position.

2. An injection valve arrangement according to claim 1, wherein the feed duct means includes a main feed duct leading to the first chamber and a branch feed duct leading from the main feed duct to the second chamber and wherein the branch feed duct and said passage are formed with respective throttles.

3. An injection valve arrangement according to claim 2, wherein the throttle in said passage exceeds in cross-sectional area the throttle in the branch duct.

4. An injection valve arrangement according to claim 3, wherein the cross-sectional area of the throttle in said passage is approximately five times the cross-sectional area of the throttle in the branch feed duct.

5. An injection valve arrangement according to claim 1, comprising a pressure control means for controlling pressure at which the auxiliary medium is supplied to the first and second chambers.

6. An injection valve arrangement according to claim 1, comprising a means for supplying water to the feed duct as the auxiliary medium.

7. An injection valve arrangement according to claim 1, wherein the valve body portion bounds a third chamber as part of the pressure relief space and the control valve includes a valve member that is located in the third chamber and is spring-loaded toward the closed position of the control valve.

8. An injection valve arrangement according to claim 7, wherein the valve body portion defines a drain passage extending from the third chamber.

9. An injection valve arrangement according to claim 1, wherein the control valve is a solenoid valve.

10. An injection valve arrangement according to claim 9, further comprising an electronic control unit for providing an electric control signal to the solenoid valve dependent on operation of the engine.

11. An injection valve arrangement according to claim 1, wherein the engine is a large diesel engine.

12. An injection valve arrangement for injecting a fuel and an auxiliary medium into a cylinder of an internal combustion engine, the auxiliary medium being selected so that concentration of noxious substances in combustion products of the fuel is reduced relative to when no auxiliary medium is injected into the cylinder, the arrangement comprising:

a first injection valve for injecting said auxiliary medium into the combustion chamber, the first injection valve comprising a first valve body portion which bounds first and second chambers, a feed duct means for supplying said auxiliary medium to the first and second chambers, and a passage that extends from the second chamber and opens into a pressure relief space, wherein said first chamber is in communication with the combustion chamber by way of at least one nozzle orifice, and the first injection valve further comprising an elongated valve member which extends through the first chamber and is movable in the first valve body portion between a closed position, in which it prevents injection of the auxiliary medium from the first chamber into the combustion chamber, and an open position, in which it allows auxiliary medium from the first chamber to be injected into the combustion chamber by way of the nozzle orifice, and a spring urging the valve member toward its closed position, and wherein the first chamber is bounded by a first piston surface of the valve member and the second chamber is bounded by a second piston surface of the valve member, said first and second piston surfaces facing respectively toward and away from the combustion chamber, a control valve associated with said passage and having a closed position in which it blocks said passage and an open position in which it allows auxiliary medium to escape from the second chamber to the pressure relief space by way of the passage, such that when the control valve is in the open position the pressure of the auxiliary medium in the second chamber falls and the force acting on the valve member due to the pressure of the auxiliary medium in the first chamber is sufficient to move the elongated valve member to its open position, and a second injection valve for injecting said fuel into the cylinder, the second injection valve comprising a second valve body portion and a second elongate valve member that is movable relative to the second valve body portion between an open position in which it allows fuel to be injected into the cylinder by way of at least one valve orifice and a closed position in which it prevents injection of fuel into the cylinder, wherein the first and second valve body portions are respective portions of a single valve body, and the nozzle orifice of the second injection valve is arranged at a different position axially of the cylinder than the nozzle orifice of the first injection valve.

* * * * *